April 9, 1940.  A. SPALEK ET AL  2,196,328
HEIGHT GAUGE
Original Filed Feb. 16, 1939
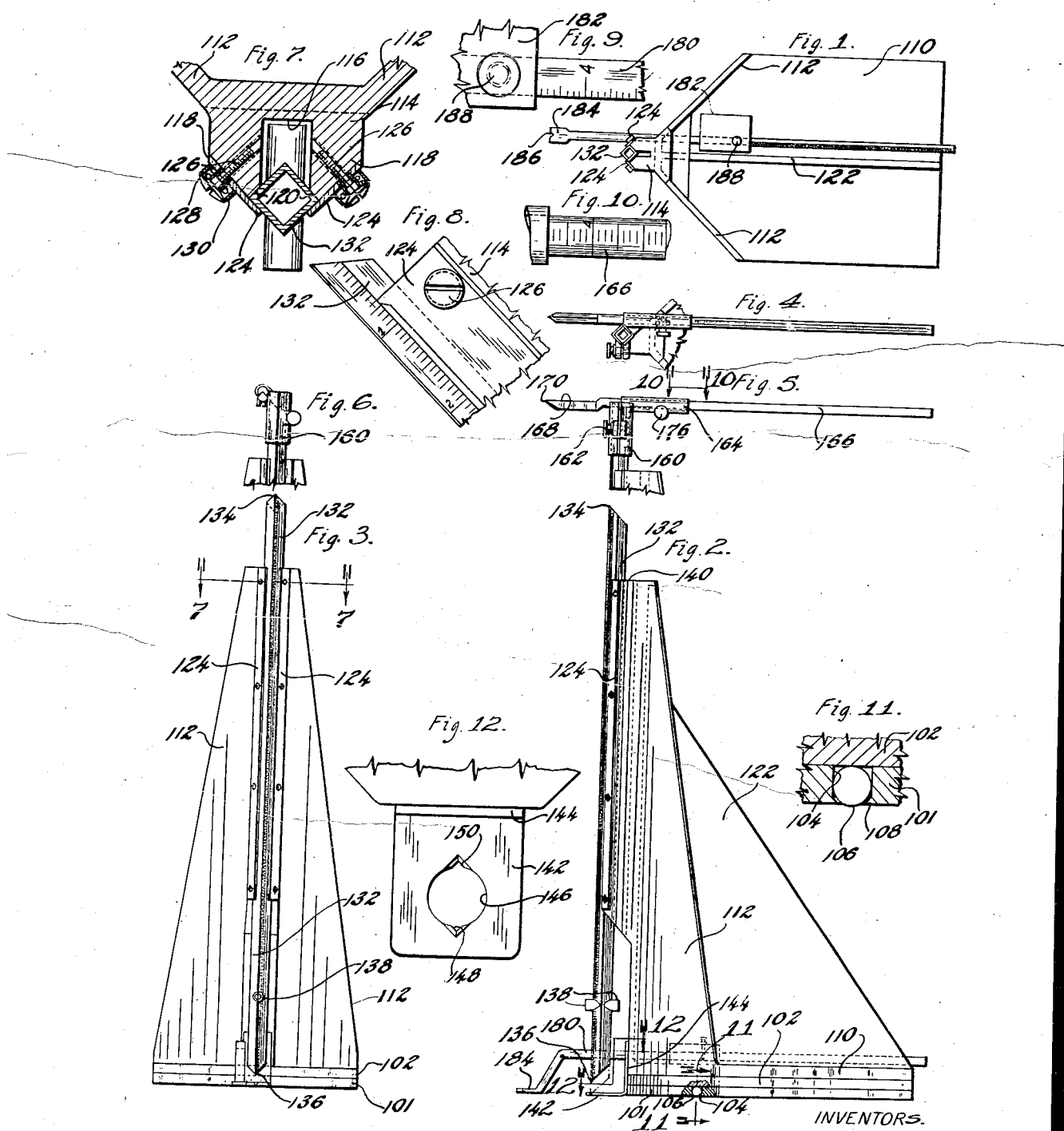
INVENTORS.
Adolph Spalek
William J. Zrenchik
BY Harness, Dickey & Pierce
ATTORNEYS.

Patented Apr. 9, 1940

2,196,328

UNITED STATES PATENT OFFICE 2,196,328

HEIGHT GAUGE

Adolph Spalek and William J. Zrenchik, Detroit, Mich., assignors to Spalek Engineering Company, Detroit, Mich., a partnership composed of Adolph Spalek and William J. Zrenchik Original application February 16, 1939, Serial No. 256,785. Divided and this application June 27, 1939, Serial No. 281,442

9 Claims. (Cl. 33—169)

This application is a division of co-pending application of Adolph Spalek and William J. Zrenchik, Serial No. 256,785, filed February 16, 1939.

The present invention relates to a height gauge construction and particularly relates to such a construction adapted to be used with apparatus for supporting models, stampings, castings, blue prints, and/or the like in tilted positions for the purpose of making projected layouts, developing templets, laying out and checking models, stampings, or machine surfaces, and for other purposes which will become apparent from the complete description in the co-pending application referred to above.

One of the primary objects of the invention is to provide an apparatus capable of a variety of uses by which considerable time and money may be saved in the drafting room, model room, and machine shop.

Another object of the invention is to provide an apparatus by which the above-mentioned work may be accurately and reliably accomplished in a comparatively short time by comparatively unskilled and inexperienced workmen.

Another object of the invention is to provide an apparatus of the type mentioned above used for projecting points for templets and making developed layouts in which the prior laborious process of using the theory of descriptive geometry by projecting the views in engineering drawings into different planes is dispensed with, thereby providing a less expensive way to perform this work.

Another object of the invention is to provide an improved height gauge which is stable yet which may be readily moved over a supporting surface.

Another object of the invention is to provide an improved height gauge by the use of which projections may be quickly and directly made.

Another object of the invention is to provide an improved height gauge by which points laterally inset from portions of an article may be readily measured.

Other objects of the invention will become apparent from the following specification, the drawings relating thereto and from the claims hereinafter set forth.

In the drawing, in which like numerals are used to designate like views in the several views throughout:

Figures 1 through 12 are views of a height gauge construction embodying features of the present invention;

Figure 1 is a top plan view of the gauge construction;

Fig. 2 is a side elevational view of the structure shown in Fig. 1;

Fig. 3 is a front elevational view of the structure shown in Fig. 1;

Fig. 4 is a fragmentary plan view of the top of the gauge shown in Fig. 1, having an attachment thereon;

Fig. 5 is a side elevational view of the structure shown in Fig. 4;

Fig. 6 is an end elevational view of the structure shown in Fig. 5;

Fig. 7 is an enlarged cross-sectional view taken substantially along the line 7—7 of Fig. 3;

Fig. 8 is an enlarged, fragmentary side elevational view of the top of the height gauge illustrating certain details of construction;

Fig. 9 is an enlarged, fragmentary top plan view showing certain details of the bottom scale and the manner in which it is mounted;

Fig. 10 is an enlarged fragmentary plan view taken substantially along the line 10—10 of Fig. 5;

Fig. 11 is an enlarged cross-sectional view taken substantially along the line 11—11 of Fig. 2; and Fig. 12 is an enlarged, fragmentary plan view taken substantially along the line 12—12 of Fig. 2.

In the parent application referred to, an apparatus as disclosed and claimed is capable of a variety of uses which will be pointed out hereinafter. The apparatus is particularly adapted for use in the drafting room for the purpose of making projected layouts from models, stampings, castings, blueprints and/or the like.

For making developed layouts it has been the practice to use engineering drawings in which the views are projected into different planes by the theory of descriptive geometry. This is a slow and tedious process and requires draftsmen of the highest skill so that the work is expensive to perform. The work is particularly important in articles having complicated curved surfaces such as are found in automobile body parts, in the fenders, for example.

In general, according to the invention disclosed and claimed in the parent application referred to above and the present application, an apparatus is provided which includes a base having a stationary table mounted thereon in which the stationary table may serve as a drafting board. A tiltable article supporting member is disposed above the table and is so mounted that it may be tilted to selected compound angles relative to the table so that an article supported on the support may be readily set at the desired tilted position. Supports for the article support extend above the table and are so constructed and arranged as to provide a three-point support for the article support. One end of the article support is pivotally connected to one of the points so that it may be pivoted relative thereto in cross-planes; and the other end of the article support is slidably mounted upon the other two of the three points. The article support is so mounted that it may be vertically adjusted at the point of pivotal connection and at the points of the slidable connection so that these points may be vertically adjusted independently of each other. In this way, it will be evident that the article support may be tilted to practically any selected compound angle relative to the working table.

Means are provided for attaching an article to the article support, which may be a model, blueprints or the like. Such articles may be attached either to the under or top surfaces of the article support depending upon the use to which the apparatus is being put. Assuming that a model is attached to the under surface of the article support with the longitudinal center line of the model aligned with the longitudinal center line of the article support, it will be seen that the article may then be set at the desired compound angle relative to the working surface of the stationary table. It is then a relatively simple matter, through the use of the height gauge, illustrated herein, to project points on the model directly to a drawing board supported on the stationary table and to thereby form the working drawings directly. This is a purely mechanical process which dispenses with the prior tedious process requiring the use of descriptive geometry, as mentioned above.

Referring to the drawing, the height gauge includes a base formed of a pair of superimposed plate members 101 and 102 which are secured together. The plate member 101 is provided with a plurality of openings 104 therethrough at predetermined spaces within which balls 106 are adapted to be rotatably received. The opening is of such a size and the plate member 101 is of such thickness that the ball members fit snugly within the openings but may rotate therein and project slightly below the under surface of plate 101. The balls may be held in position by peening over the edges of the opening or otherwise forming the opening to retain the balls, as indicated at 108. The plate members 101 and 102 are of such weight as to give the height gauge stability when it is placed on the table, and the balls serve to provide for ease in sliding the gauge over the paper upon which it rests.

The height gauge also includes another base member 110 which is adapted to rest upon the plate member 102 and be secured thereto. The base 110 has upstanding sides 112 which are substantially at right angles to each other and which have formed integral therewith an upstanding scale supporting portion 114. The portion 114 is provided with a vertically extending groove 116 therein and the outer surfaces 118 are at right angles to each other. The portion 114 is also provided with bevelled edges 120 adjacent the front sides of the groove 116 for a purpose that will become more apparent from the following description.

A central bracing web 122 is connected to the base 110 and also to the back surface of the portion 114 over a portion of its height in order to brace the construction.

The surfaces 118 and 120 are accurately formed so that they are truly vertical to the base 101. Such surfaces cooperate with spring gibs 124 in the form of elongated strips which are adapted to be attached to the surfaces 118 and project beyond the surfaces 120. Such strips may be resiliently attached to the surfaces 118 of portions 114 by means of a plurality of vertically spaced screws 126 which are threadably received within threaded openings in the portions 114 through surfaces 118. These screws also project through aligned openings in the strip members 124; and coil springs 128 are disposed between the heads of the screws 126 and resiliently bear against the outer surfaces of strips 124. Spring covers 130 are provided between the head screws and the strip members 124. It will thus be evident that the strips 124 are resiliently urged against the surfaces 118 through the action of springs 128.

Those portions of the strip members 124 which project beyond the surfaces 120 form with the surfaces 120 oppositely disposed right angled seats which are adapted to slidably mount a vertical scale 132. The scale 132 is square in cross-section and has the upper and bottom edges thereof bevelled to provide vertically aligned points 134 and 136. The scale 132 may, of course, be positioned so that the points 134 and 136 are forwardmost, as illustrated in Fig. 2, or the scale may be reversed so that the points are innermost, depending upon the most convenient position for the points to reach a particular point on the work. The scale 132 may be slid up and down relative to the base; and in order to facilitate these movements oppositely extending, finger engaging projections 138 are provided on the scale adjacent the lower end thereof. By grasping one of these projections, it will be evident that the scale may be very readily slid up and down.

In the use of the structure so far described, the height gauge is positioned on the table and the scale 132 is moved upwardly so that the point 134 contacts exactly that point on the article which is to be projected to the paper on the table. The top surface 140 of portion 114 may be considered as the datum plane; and the distance from this plane to the point on the article will be directly indicated on the scale carried on member 132. By taking this reading and then sliding the scale 132 directly downwardly without moving the base, so that the point 136 strikes against the paper on the table, a point corresponding to that of the point on the article will be indicated on the paper. This may be marked with pencil together with the scale reading as taken before the scale is moved downwardly.

In order to eliminate the necessity of moving the scale 132 downwardly after the pointer 134 is positioned against the article, a plate member or shield 142 has an upstanding portion 144 which is secured to the front of the base plates 101 and 102 so that the plate 142 is flush with the under surface of plate 101. The plate 142 is provided with an aperture 146 therethrough having notches 148 and 150 which correspond to the positions that point 136 would assume when it is lowered, depending upon whether it is positioned forwardly or rearwardly, respectively. In using this plate, it is merely necessary to position the scale so that the point 134 is in contact with that point on the article which is to be projected; and such point may be indicated directly in either notch 148 or 150 and the scale reading penciled in adjacent this mark.

By moving the height gauge in increments along those portions of the article to be projected, it is evident that such projection may be very rapidly and accurately made.

In Figs. 4, 5, 6, and 10, an attachment is illustrated which is adapted to be used to reach over or into portions of the article supported on the tiltable support, for example, when the work is fastened on the top side of the support, or in laying out in measuring points on irregular surfaces which are inset from a laterally projecting portion of the article. Such attachment includes a split sleeve 160, having a cross-sectional configuration complementary to that of the scale 132, which is adapted to be slid over the upper end of scale 132, and be removably fixed in position by means of a thumb screw 162 which is received within threaded openings in lugs on opposite sides of the split in the sleeve. The sleeve 160 is fixed in position so that the upper edge thereof lies exactly flush with the top of point 134.

A scriber holder 164 is integral with the sleeve 160 and is so positioned that its centerline is exactly at a right angle to the axis of the sleeve 160. The member 164 is also positioned so that its centerline is at the top edge of sleeve 160 so that when the measuring or scribing attachment 166 is inserted within the member 164 its axis is on the same level as the top edge above mentioned.

The element 166 has its forward end formed with an offset surface 168 terminating in a point 170. The surface 168 is flat so that this flat surface is at exactly the same level as the point 134, thus permitting direct reading for vertical adjustment of the scale 132. The surface 168 is also aligned with the centerline of the element 166 so that the point 170 is on the centerline regardless of the turned position of element 166. Element 166 is also provided with a scale as indicated in Fig. 10 so that the extent of projection of the point 170 may be correctly read from this scale.

The member 164 may also be split and be provided with a thumb screw 176 for the purpose of fixing the element 166 within the sleeve 164.

A lower scale attachment 180 is adapted to be used with the attachment 166 so that a point indicated by the member 166 may be projected directly to the paper through the use of attachment 180. The attachment 180 includes an elongated flat strip having a scale thereon as indicated in Fig. 9 which is received through apertures in the web portion 112 and is slidably mounted within a slot 182. The forward end of the element 180 is downwardly and then forwardly offset as indicated at 184 so that the portion 184 lies flush with the under surface of the plate 101. The forward edge of the projecting portion 184 may be notched, as indicated at 186, so that when the reading is taken of the scale on element 166, element 180 may be set in block 182 and the projected point indicated by marking in notch 186. The scale reading may be marked in pencil beside this notch mark.

A thumb screw 188 may be associated with the block 182 and is adapted to releasably engage the top surface of bottom scale 180 for the purpose of releasably fixing it in position.

The uses mentioned above are merely illustrative and it will be evident to those skilled in the art that the present apparatus is capable of a variety of other uses. The uses mentioned above are not to be considered as limiting on the invention disclosed and claimed.

Formal changes may be made in the specific embodiment of the invention disclosed without departing from the spirit and substance of the invention, the scope of which is commensurate with the appended claims.

What is claimed is:

1. A height gauge comprising a base, an upstanding support mounted on said base, and an elongated scale slidably mounted on said support for movement therealong, said scale having the ends thereof tapered to provide vertically aligned points on the ends thereof.

2. A height gauge comprising a base, an upstanding support mounted on said base, an elongated scale having the ends thereof bevelled to provide vertically aligned points thereon, and means slidably and removably mounting said scale on said support for movement therealong, whereby said scale may be positioned so that said points are positioned outwardly or inwardly of said support.

3. A height gauge comprising a base, an upstanding support mounted on said base, an elongated scale slidably mounted on said support for movement therealong, said scale having the upper end thereof bevelled to provide a point, a shield member mounted to said base substantially flush with the under surface thereof, said shield member being provided with an aperture therethrough and formed with a notch which is vertically aligned with said point.

4. A height gauge comprising a base, an upstanding support mounted on said base, an elongated scale slidably mounted on said support for movement therealong, said scale having the upper end thereof tapered to provide a point thereon, a shield member mounted to said base lying substantially flush with the under surface thereof, said shield member having an aperture therethrough formed with oppositely disposed notches therein, said notches being respectively positioned to be aligned with said point depending upon the position of said scale on said support.

5. A height gauge comprising a base, an upstanding support mounted on said base, an elongated scale slidably mounted on said support for movement therealong, an attachment adapted to be removably attached to the upper end of said scale, said attachment including a sleeve adapted to embrace said scale with the upper edge of said sleeve flush with the upper edge of said scale, another sleeve disposed at right angles to said first named sleeve having the center thereof flush with said first named sleeve, and an elongated indicator member slidably disposed within said another sleeve, said member having a point formed on the forward end thereof with said point aligned with the axis of said another sleeve for any rotative position of said member element relative to said another sleeve.

6. A height gauge comprising a base, an upstanding support mounted on said base, an elongated scale slidably mounted on said support for movement therealong, an attachment adapted to be removably attached to the upper end of said scale, said attachment including a sleeve adapted to embrace said scale with the upper edge of said sleeve flush with the upper edge of said scale, another sleeve disposed at right angles to said first named sleeve having the center thereof flush with said first named sleeve, and an elongated indicator member slidably disposed within another sleeve, said member having a point formed on the forward end thereof with said point aligned with the axis of said another sleeve for any rotative position of said member relative to said another sleeve, and another elongated indicator member slidably mounted to said base, said last named indicator member having a portion thereof substantially flush with the under surface of said base with a notch formed in the forward edge thereof, said last named indicator member being adapted to be slidably positioned to locate said notch in a position corresponding to the point on said first named indicator member.

7. A height gauge comprising a base, an upstanding support mounted on said base, an elongated scale having the ends thereof bevelled to provide vertically aligned points thereon, and resilient means mounted on said support and engaging said elongated scale slidably and removably mounting said scale on said support for frictional movement therealong, whereby said scale may be positioned so that said points are positioned outwardly or inwardly of said support.

8. A height gauge comprising a base, an upstanding support mounted on said base, an elongated scale having the ends thereof bevelled to provide vertically aligned points thereon, projections on said scale forming finger engaging means, and resilient means mounted on said support and engaging said scale slidably and removably mounting said scale on said support for frictional movement therealong, whereby said scale may be positioned so that said points are positioned outwardly or inwardly of said support.

9. A height gauge comprising a base, an upstanding support mounted on said base, an elongated scale slidably mounted on said support for movement therealong, means on the underside of said base constructed to receive balls therein so that said balls project slightly below the under-surface of said base, and balls mounted by said means to provide a running mounting for said base.

ADOLPH SPALEK.
WILLIAM J. ZRENCHIK.